(12) United States Patent  (10) Patent No.: US 7,064,745 B2
Kim  (45) Date of Patent: Jun. 20, 2006

(54) ROTARY-KEYPAD FOR A MOBILE HANDSET

(75) Inventor: Joon-Young Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 373 days.

(21) Appl. No.: 10/338,239

(22) Filed: Jan. 8, 2003

(65) Prior Publication Data

US 2003/0222853 A1 Dec. 4, 2003

(30) Foreign Application Priority Data

May 29, 2002 (KR) .................. 10-2002-0029986

(51) Int. Cl.
*G09G 5/00* (2006.01)
(52) U.S. Cl. .................. 345/169; 345/184; 379/433.07
(58) Field of Classification Search ................ 345/156, 345/168, 169, 170, 171, 172, 184; 341/35; 379/433.01, 433.06, 433.07
See application file for complete search history.

(56) References Cited

U.S. PATENT DOCUMENTS

| 4,875,234 A | 10/1989 | Tragatschnig |
| 6,593,914 B1 * | 7/2003 | Nuovo et al. ............... 345/169 |
| 2002/0122031 A1 * | 9/2002 | Maglio et al. ............. 345/184 |
| 2003/0044000 A1 * | 3/2003 | Kfoury et al. ......... 379/433.04 |

FOREIGN PATENT DOCUMENTS

| EP | 0 998 102 A2 | 5/2000 |
| WO | WO 02/37806 A2 | 5/2002 |

* cited by examiner

*Primary Examiner*—Dennis-Doon Chow
(74) *Attorney, Agent, or Firm*—Lee, Hong, Degerman, Kang & Schmadeka (57) ABSTRACT

A keypad is configured for use with a portable unit having a display unit positioned in a first viewing orientation, such that the keypad's viewing orientation is rotably adjustable in cooperation with the orientation of the display, when the display unit is positioned in a second viewing orientation.

18 Claims, 8 Drawing Sheets

ROTARY-KEYPAD FOR A MOBILE HANDSET

CROSS REFERENCE TO RELATED APPLICATION

Pursuant to 35 U.S.C. §119(a), this application claims the benefit of earlier filing date and right of priority to Korean Patent Application No. 2002-29986, filed on May 29, 2002, the contents of which is hereby incorporated by reference herein in its entirety.

BACKGROUND OF THE INVENTION

1. Field of the Invention

The present invention relates to a mobile handset and, more particularly, to a rotating-keypad for a mobile handset allowing a keypad to rotate relative to the body of the mobile handset.

2. Description of the Background Art

Mobile handsets continue to grow in popularity as they can be implemented to provide additional features and functionality. Mobile phones are being developed that provide various multimedia functions by executing numerous applications that provide services beyond the existing voice communication services.

The increase in the amount of information to be processed and viewed due to the addition of the multimedia functions into the mobile handset has required larger-scale display screens. In this respect, a liquid crystal display screen (LCD) of a folder-type mobile handset is being developed that has a vertically longer configuration.

Figure 1:
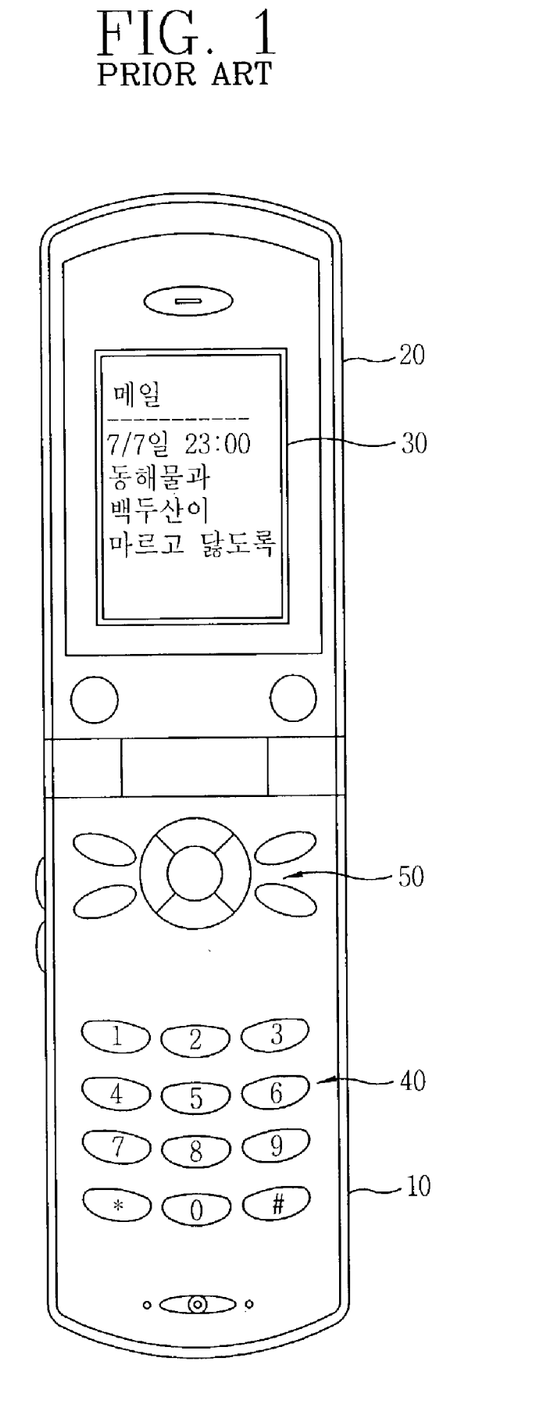
FIG. 1 is a front view showing a mobile handset in accordance with conventional art.

FIG. 1 is an exemplary view showing a folder type mobile handset.

As shown in FIG. 1, in a state that the folder type mobile handset is unfolded, a display screen 30 is disposed on a cover 20, and a main key pad 40 is disposed at a lower portion of a main body of the mobile handset and an auxiliary key pad 50 is disposed at the upper side of the main key pad 40. As shown, the display screen's 30 height is larger than its width.

Though display screen 30 may be suited to display a portrait image or characters, it is not suitable for displaying a horizontally long landscape image or a video clip usually.

As a matter of course, the landscape image may be displayed in conformity to the width of the display screen. But in such a case, the image is reduced in size, failing to utilize the entire screen. And even if the landscape image is displayed on the entire screen, the original image would be positioned vertically, providing an unsuitable orientation for viewing purposes.

In such a case, the mobile handset itself need to rotated at an angle of 90° in order to view the image, which would cause the user to feel complexity for manipulating a 90°-rotated keypad arrangement.

SUMMARY OF THE INVENTION

In accordance with one aspect of the invention, a rotating-keypad for a mobile communication terminal having a user interface for manipulating display of a display screen, comprises: a keypad having a base for mounting the keypad into a recessed bay formed on a surface of a mobile communication terminal; wherein the base is rotatably mounted in the recessed bay. The rotating-keypad comprises: a disc-shaped keypad body; a rotation shaft approximately perpendicularly connected at an approximate center of bottom surface of the keypad body; and an anchor portion vertically extending from a bottom surface of the keypad body around the rotation shaft, the anchor portion having a smaller diameter than that of the keypad body.

The anchor portion comprises a stopper formed on a circumferential surface thereof and a first contact portion formed on a bottom surface thereof for electrical connection with the main body of the mobile communication terminal. In certain embodiments, the anchor portion is provided with first and second fixing holes formed on the circumferential surface thereof at respective approximate angles of 90° and 180° relative to the stopper. The recessed bay is provided with a shaft hole formed at an approximate center of bottom surface thereof for receiving the rotation shaft of the rotating-keypad and the recessed bay is preferably concaved in shape for receiving the anchor portion of the rotating-keypad around the shaft hole.

In the rotating-keypad, a second contact portion is formed on a bottom surface of the base so as to contact the first contact portion at an initial state and a third contact portion is formed at an approximate angle of 90° from the second contact portion. A guide groove is, preferably, formed along a circumferential wall of the base on the axis of the shaft hole between the second and third contact portions for receiving the stopper of the rotating-keypad.

In certain embodiments, the stopper slides along the guide groove so as to limit rotation of the rotating-keypad at an approximate angle of 90°. The recessed bay may be provided with a holder passage through which a keypad holder may be inserted so as to allow a user to rotatably manipulated the orientation of the keypad. The keypad holder may also include a knob that extends from outer circumference of the communication mobile terminal toward the base and is biased in one direction by an elastic member so that an end of the keypad holder is engaged with the concave portion.

In one or more embodiments, the keypad-mounting bay is provided with at least one opening formed on a circumferential wall thereof and the circumferential portion of the keypad body is partially exposed through said at least one opening. Said outer circumferential portion of the keypad body has ridges to facilitate manipulation of the keypad in clockwise or counter-clockwise directions.

Depending on implementation, the display screen can display information in a first orientation different from the initial display orientation. When the information is displayed in the first orientation, the rotating-keypad can be manually or automatically rotated to match the first orientation.

In accordance with another aspect of the invention, a keypad is configured for use with a portable unit having a display unit positioned in a first viewing orientation, such that the keypad's viewing orientation is rotatably adjustable in cooperation with the orientation of the display, when the display unit is positioned in a second viewing orientation.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Reference will now be made in detail to the preferred embodiments of the present invention, examples of which are illustrated in the accompanying drawings.

DETAILED DESCRIPTION OF THE PREFERRED EMBODIMENTS

Figure 2:
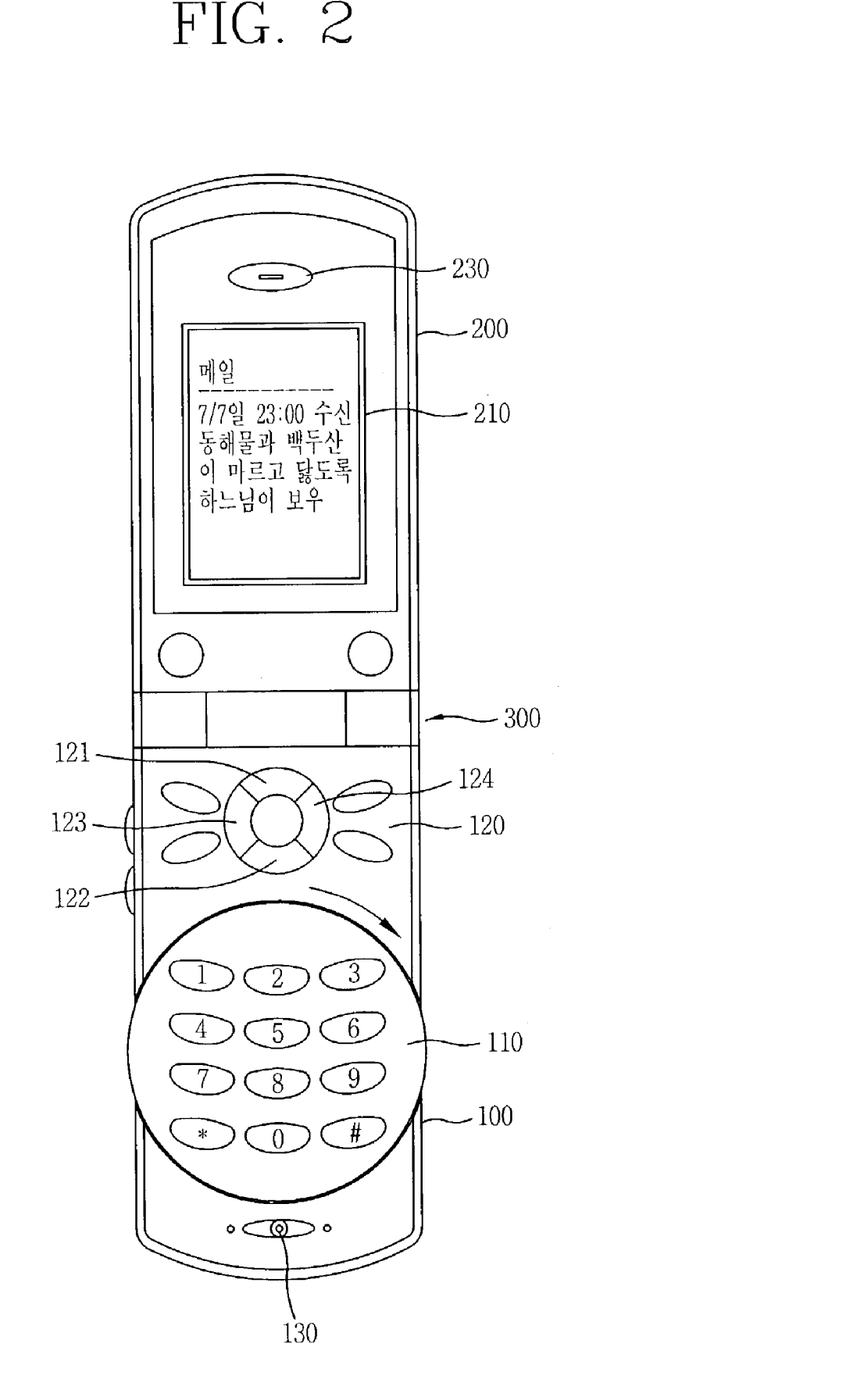
FIG. 2 is a front view showing a rotating-keypad mobile handset in accordance with one embodiment of the present invention.

Referring to FIG. 2, in accordance with one aspect of the invention, a folder type rotating-keypad mobile handset comprises a main body 100 and a cover 200 one end of which is pivotally connected by a hinge mechanism 300.

A microphone 130 is disposed at a lower portion of the main body 100 and a navigation keypad 120 for a function manipulation is disposed at a front upper portion. A disc type rotating-keypad 110 is rotatably mounted between the microphone 130 and the navigation keypad 120, for example.

A speakerphone 230 is disposed at an inner upper portion of the cover 200, and a longitudinally oriented display screen 210 is installed at a lower side of the speaker phone 230.

In the portrait image mode, the rotating-keypad 110 is arranged in a first direction so that information displayed on the display screen 210 has an orientation that is compatible with the orientation of the rotating-keypad 110.

Figure 3:
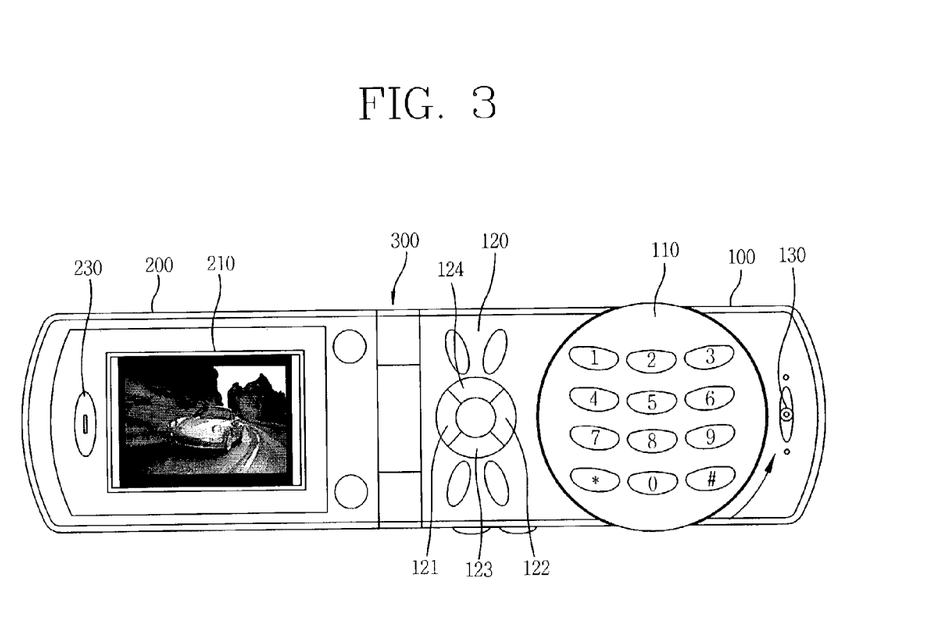
FIG. 3 is another view of the mobile handset of FIG. 2 showing the rotating-keypad rotated at an angle of 90° in a clockwise direction relative to handset body.

FIG. 3 is a drawing illustrating the rotating-keypad mobile handset repositioned into a landscape image mode.

With reference to FIG. 3, the rotating-keypad 110 is rotated at an angle of approximately 90° in the clockwise direction from a portrait image mode to match the display orientation of an image displayed on the display screen 210 has been rotated at the angle of approximately 90° in the clockwise direction.

In such a case, the up, down, left, and right direction keys 121, 122, 123 and 124 of the navigation keypad 120 respectively become left, right, down, and up direction keys in relation to the new orientation of the image.

Figure 4:
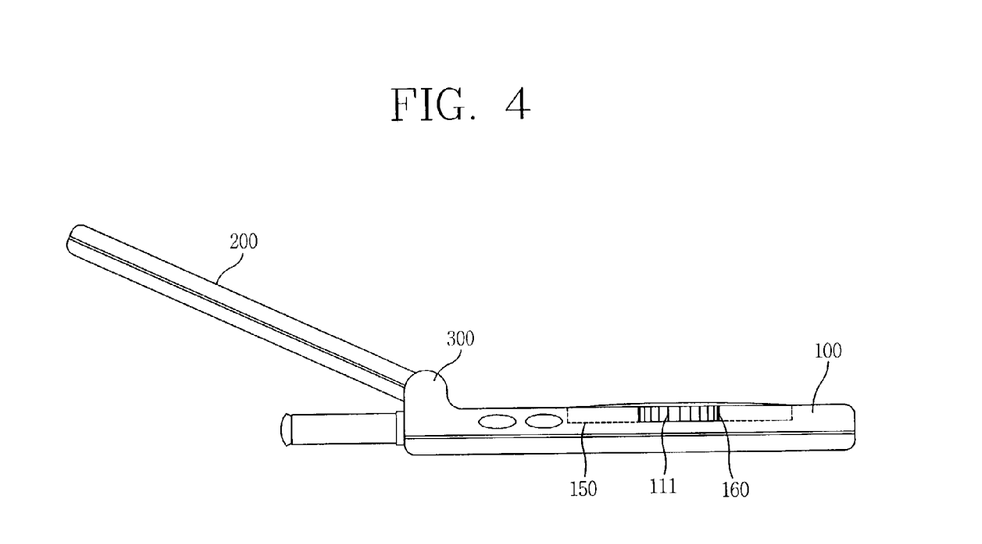
FIG. 4 is a side view of the rotating-keypad mobile handset of FIG. 2.

FIG. 4 is a side view of the folder type rotating-keypad mobile handset of FIG. 3.

As shown in FIG. 4, the main body 100 comprises a base for mounting the keypad into a mounting bay 150 that is recessed into the face of the mobile terminal correspondingly to the rotating-keypad 110, so that the rotating-keypad 110 is rotatably mounted in the mounting bay 150.

The mounting bay 150 is provided with a pair of openings 160 formed on two opposite sides of the wall formed around the mounting bay 150 such that the circumferential surface of the rotating-keypad 110 is partially exposed through the openings 160. This allows a user to rotate the rotating-keypad 110 by manipulating the exposed portions of the rotating-keypad 110.

Figure 5A:
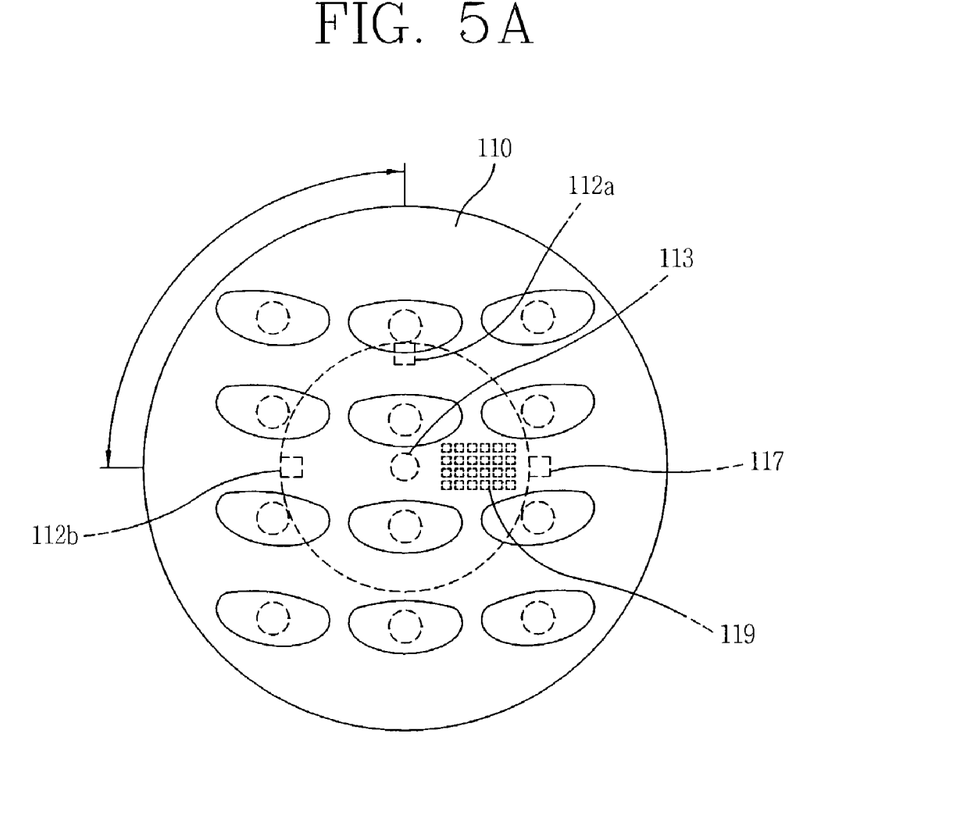
FIG. 5A is a top planar view illustrating the rotating-keypad of the mobile handset of FIG. 2.
Figure 5B:
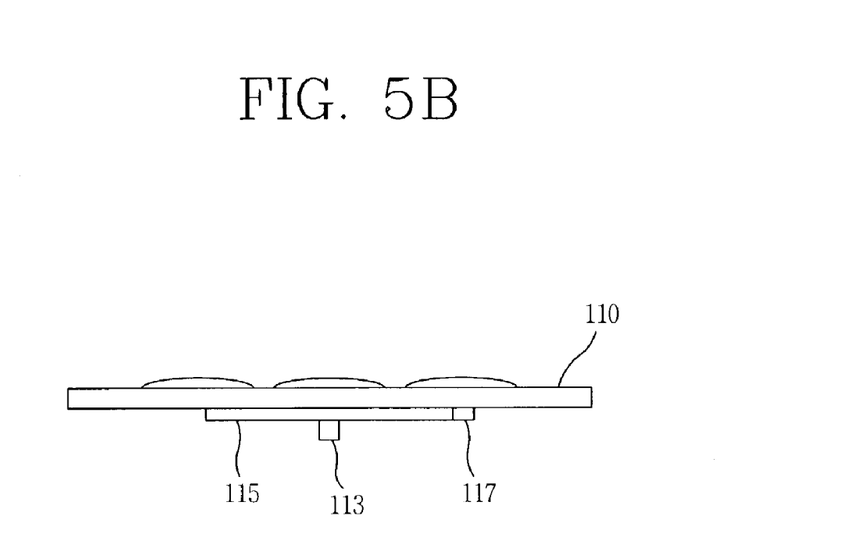
FIG. 5B is a side planar view of the rotating-keypad of FIG. 5A.

FIG. 5A and FIG. 5B are perspective planar and a side views illustrating the rotating-keypad 110 of the mobile handset of FIG. 2.

As shown in FIG. 5A and FIG. 5B, in one embodiment, the rotating-keypad 110 comprises a disc-shaped keypad body, a rotation shaft 113 approximately perpendicularly connected at a center of the bottom surface of keypad body, and a preferably disc-shaped anchor 115 downwardly protruding from the bottom surface of keypad body around the rotation shaft 113, the anchor 115 preferably having smaller diameter than that of the keypad body 110. It should be noted that the keypad body and anchor 115 may be shaped in other geometric configurations.

In one embodiment, the keypad body 110 is provided with a circumferential ridged surface 111 so as to facilitate a better grip for a user to rotate the rotating-keypad 110 by applying pressure on the ridged surface exposed through the openings 160.

The anchor 115 of the rotating-keypad includes a stopper 117 formed at one side of the circumferential surface of the anchor 115, and a first contact portion 119 formed on the bottom surface for electrical connection with the main body 100 of the mobile handset.

In some embodiments, the anchor 115 is provided with first and second fixing holes 112a and 112b formed on the circumferential surface thereof at respective angles of approximately 90° and 180° relative to the position of the stopper 117 in a counterclockwise direction, for example. The rotating-keypad 110, may rotate in either clockwise or counter-clockwise directions, depending on design and implementation.

Figure 6:
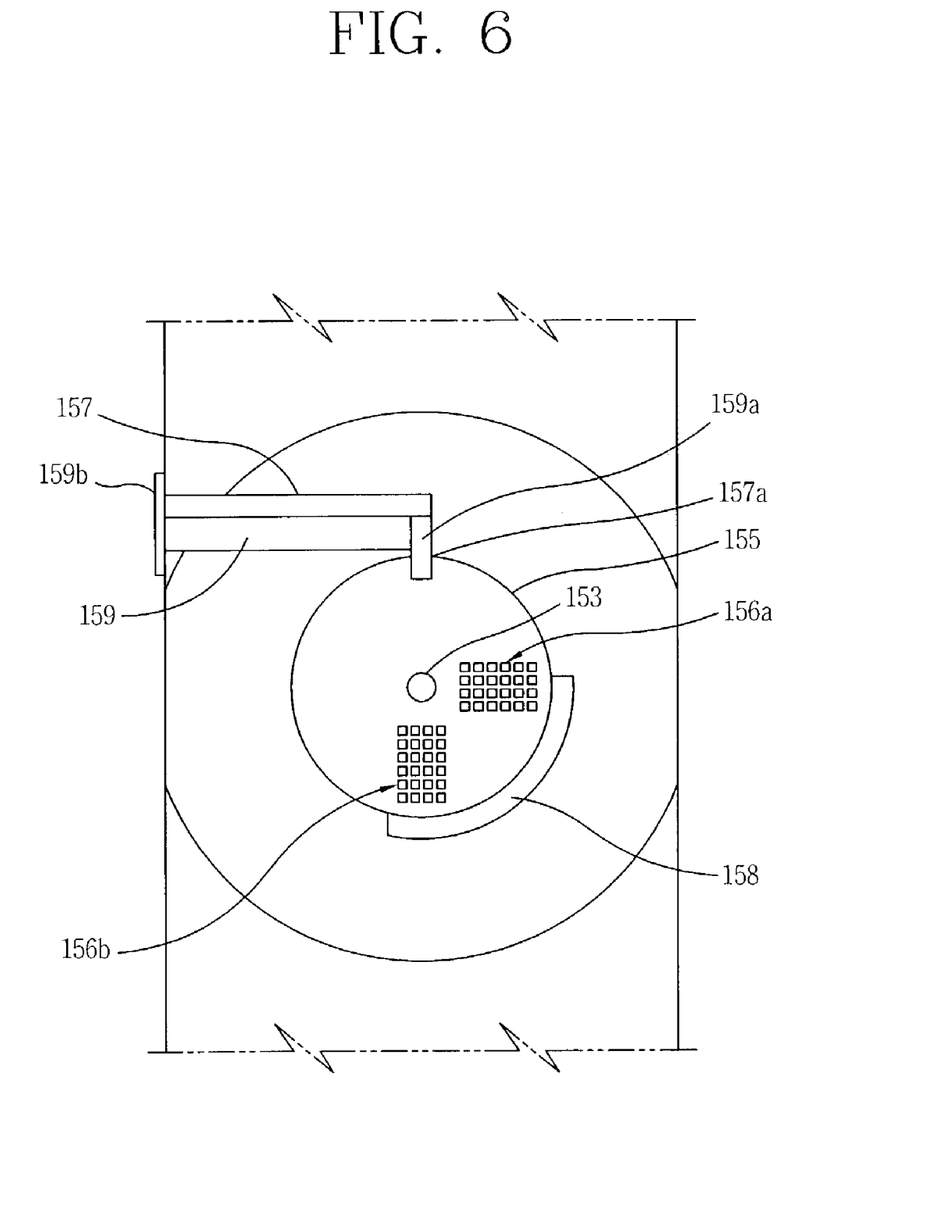
FIG. 6 illustrates a keypad-mounting bay of the mobile handset of FIG. 2 in accordance with one or more embodiments.

FIG. 6 is a top planar view showing a keypad-mounting bay 150 of the rotating-keypad mobile handset of the present invention, in accordance with one embodiment.

As shown in FIG. 6, the mounting bay 150 is provided with a shaft hole 153 centrally formed for receiving the rotation shaft 113 of the rotating-keypad 110. A preferably concaved portion 155 is formed on the surface of the mounting bay 150 for receiving the anchor 115 of the rotating-keypad around the shaft hole 153. Alternatively, concaved portion 155 may be a cavity formed in any shape suitable for housing that anchor 115.

The concave portion 155 is provided with a second contact portion 156a formed on the bottom surface thereof so as to contact the first contact portion 119 in the portrait image mode and a third contact portion 156b formed at an approximate angle of 90° in the clockwise direction, for example, from the second contact portion 156a. The third contact portion 156b contacts first contact portion 119 in the landscape image mode.

Also, the concave portion 155 is provided with a guide groove 158 formed along the circumferential wall thereof as much as 90° on the axis of the shaft hole 113 between the second and third contact portions 156a and 156b for receiving the stopper 117 of the rotating-keypad 110 such that the stopper 117 slides along the guide groove 158 to limit rotation of the rotating-keypad at the angle of 90°.

The keypad-mounting bay 150 is provided with a holder passage 157 communicating outside the main body 100 through which a keypad holder 159 is inserted so as to be manipulated outside.

The keypad holder 159 is downwardly biased by an elastic member (not shown) so that a head 159a of the keypad holder 159 is engaged with the first and second fixing holes 112a or 112b through the holder fixing hole 157a.

When the rotating-keypad 110 is mounted in the keypad mounting bay 150, the first contact portion 119 of the rotating-keypad 110 contacts the second contact portion of the keypad mounting bay 150 and the stopper 117 of the rotating-keypad 110 is positioned in the guide groove 158 of the keypad mounting bay 150.

The head 159a of the holder 159 is inserted into the first fixing hole 112a of the anchor 115 mounted inside the concave portion 155 by the elastic member.

The operation of the rotating-keypad mobile handset constructed as above will now be explained.

With reference to FIG. 2, in a state that the rotating-keypad mobile handset of the present invention is set in a portrait image mode, the display screen 210 displays information in a vertical orientation in relation to the body of the mobile handset.

When a program requiring a landscape image mode is executed by a key manipulation on the rotating-keypad 110 in the portrait image mode, the display screen 210 displays information rotated at the approximate angle of 90° in a clockwise direction, for example.

Referring to FIG. 6, in such a case, a user pushes up a knob 159b of the holder 159, for example, away from the main body, and rotates the rotating-keypad 110 in a clockwise direction, for example.

At this time, the rotation angle of the rotating-keypad 110 is limited at the angle of, for example, 90° by a guide groove 158, so that the second fixing hole 112b is positioned facing the fixing hole 157a.

In this state, the holder 159 is biased downwardly by the elastic force of the elastic member, and accordingly, the holder 159a is engaged with the second fixing hole 112b through the holder fixing hole 157a, so that the keypad is completely rotated to be easily manipulated in the landscape image mode.

In the landscape image mode, the first contact portion 119 of the rotating-keypad 110 is positioned rotated at the approximate angle of 90° with respect to the position of the portrait image mode and is in contact with a third contact portion 156b of the keypad mounting bay 150.

Accordingly, the operation mode of the mobile handset is converted from the portrait image mode to the landscape image mode or vice versa, and the electric connection between the rotating-keypad and the main body is maintained in so that a signal provided by the keypad is transmitted to the main body.

In a case that the mobile handset is converted from the landscape image mode to the portrait image mode, the rotating-keypad 110 can be rotated at the approximate angle of 90° in the counterclockwise direction and fixed in the same manner as described above.

The rotating-keypad 110 can be implemented in such a manner that the rotating-keypad 110 automatically rotates in a required direction in a predetermined time if the display mode is converted from the portrait image mode to the landscape image mode and vice versa.

The display mode conversion of the display screen 210 can be performed according to the rotational movement of the rotating-keypad such that the display mode is converted by rotating the rotating-keypad 110.

In some embodiments, the rotating-keypad 110 may also be used as a dial for adjusting brightness of the display screen 210.

Figure 7:
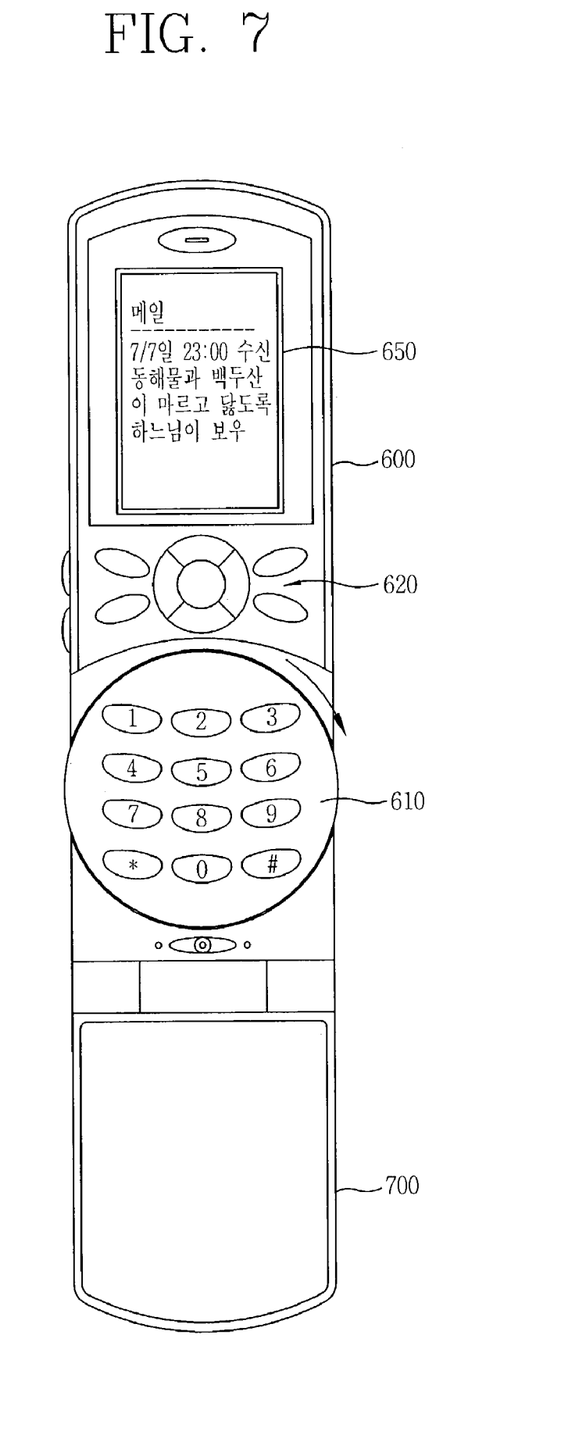
FIG. 7 is a front view of a rotating-keypad mobile handset in accordance with another embodiment of the present invention.
Figure 8:
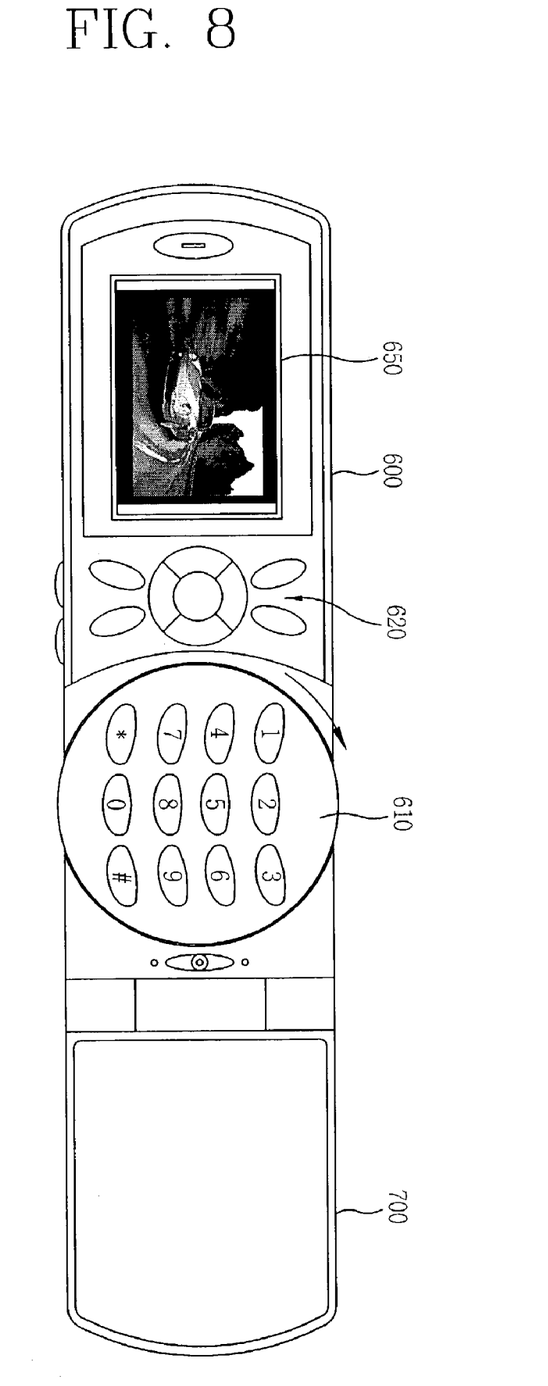
FIG. 8 is a view showing a rotating-keypad of the mobile handset of FIG. 7 rotated at an angle of 90° in a clockwise direction relative to a handset body.
Figure 9:
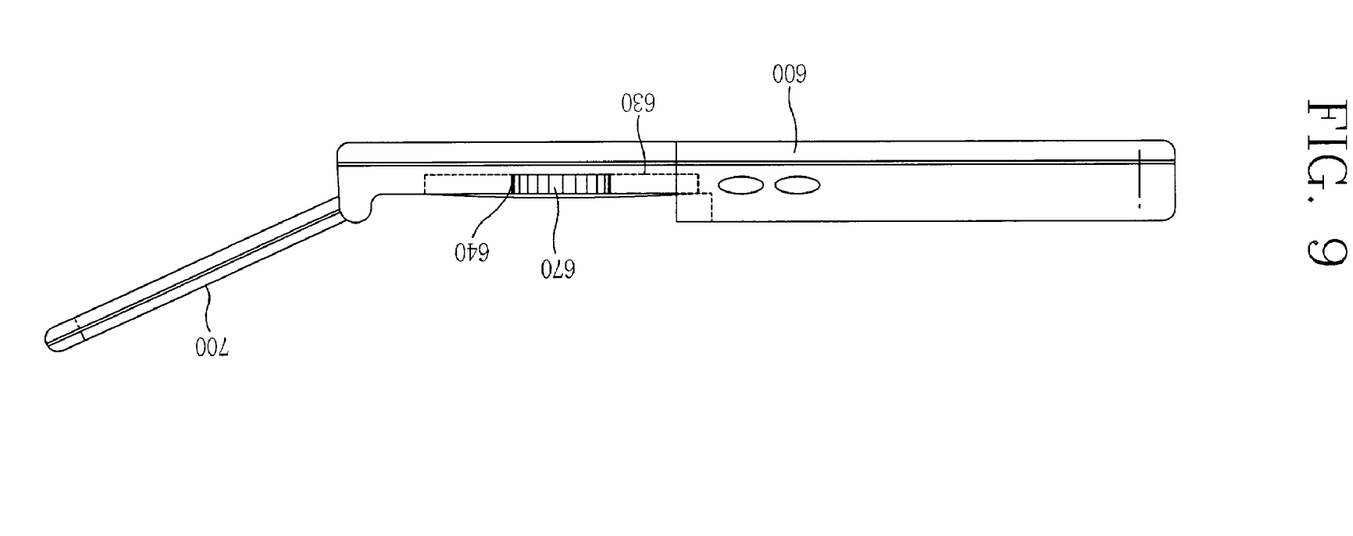
FIG. 9 is a side view of the rotating-keypad mobile handset of FIG. 7.

FIG. 7 is a front view of a rotating-keypad mobile handset in accordance with a second embodiment of the present invention. FIG. 8 is a view showing that the rotating-keypad of the mobile handset of FIG. 7 is rotated in the counter-clockwise direction, and FIG. 9 is a side view of the rotating-keypad mobile handset of FIG. 7.

As shown in FIG. 7, a flip type rotating-keypad mobile handset according to the second embodiment of the present invention is similar to the folder type mobile handset in structure and function of elements, except that a display screen 650, a rotating-keypad 610, and a navigation keypad 620 are arranged at a main body 600, and a flip 700 is pivotally attached at a lower end portion of the main body 600.

As described above, the rotating-keypad mobile handset of the present invention can be adaptively applied to utilize the entire screen by displaying information rotated at the approximate angle of 90° when a landscape image display is needed.

Also, in case that a landscape image is displayed on the screen rotated at the approximate angle of 90°, the rotating-keypad of the mobile handset may be rotated to have the same orientation, so that the user can manipulate the keypad while viewing the information of the landscape image without confusion.

Moreover, since the up, down, left, and right direction keys on the navigation keypad respectively function to move the image in accordance with the respective direction and orientation, the user can intuitively manipulate the direction keys.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A rotating-keypad for a mobile communication terminal having a user interface for manipulating display of a display screen, the rotating-keypad comprising:
    a keypad having a base for mounting the keypad into a recessed bay formed on a surface of a mobile communication terminal, wherein the base is rotatably mounted in the recessed bay;
    a disc-shaped keypad body;
    a rotation shaft approximately perpendicularly connected at an approximate center of a bottom surface of a keypad body; and
    an anchor portion vertically extending from a bottom surface of the keypad body around the rotation shaft, the anchor portion having a smaller diameter than that of the keypad body,
    wherein the anchor portion comprises a stopper formed on a circumferential surface thereof.

2. The rotating-keypad of claim 1, wherein the anchor portion comprises a first contact portion formed on a bottom surface thereof for electrical connection with a main body of the mobile communication terminal.

3. The rotating-keypad of claim 2, wherein the anchor portion is provided with first and second fixing holes formed on a circumferential surface thereof at respective approximate angles of 90° and 180° relative to the stopper.

4. The rotating-keypad of claim 3, wherein the recessed bay is provided with a shaft hole formed at an approximate center of a bottom surface thereof for receiving a rotation shaft of a rotating-keypad.

5. The rotating-keypad of claim 4, wherein the recessed bay is a concave shape for receiving the anchor portion of the rotating-keypad around the shaft hole.

6. The rotating-keypad of claim 5, wherein a second contact portion formed on a bottom surface of the base so as to contact the first contact portion at an initial state and a third contact portion is formed at an approximate angle of 90° from the second contact portion.

7. The rotating-keypad of claim 6, wherein a guide groove is formed along a circumferential wall of the base on an axis of the shaft hole between the second and third contact portions for receiving the stopper of the rotating-keypad.

8. The rotating-keypad of claim 7, wherein the stopper slides along the guide groove so as to limit rotation of the rotating-keypad at an approximate angle of 90°.

9. The rotating-keypad of claim 8, wherein the recessed bay is provided with a holder passage through which a keypad holder may be inserted so as to allow a user to rotatably manipulate an orientation of the rotating-keypad.

10. The rotating-keypad of claim 9, wherein the keypad holder includes a knob that extends from outer circumference of the communication mobile terminal toward the base.

11. The rotating-keypad of claim 10, wherein the keypad holder is biased in one direction by an elastic member so that an end of the keypad holder is engaged with the concave shape.

12. The rotating-keypad of claim 1, wherein the keypad-mounting bay is provided with at least one opening formed on a circumferential wall thereof.

13. The rotating-keypad of claim 12, wherein a circumferential portion of the keypad body is partially exposed through said at least one opening.

14. The rotating-keypad of claim 1, wherein the outer circumferential portion of the keypad body has ridges to facilitate manipulation.

15. The rotating-keypad of claim 1, wherein the display screen displays information in a first orientation different from an initial display orientation.

16. The rotating-keypad of claim 15, wherein when the information is displayed in the first orientation, the rotating-keypad can be manually rotated to match the first orientation.

17. The rotating-keypad of claim 15, wherein when the information is displayed in the first orientation, the rotating-keypad is automatically rotated in the first orientation.

18. The rotating-keypad of claim 15, wherein the keypad configured for use with a portable unit having a display unit positioned in the first orientation, such that a keypad's viewing orientation is rotatably adjustable in cooperation with the an orientation of the display unit when the display unit is positioned in a second orientation.

* * * * *